Patented May 12, 1942

2,282,323

UNITED STATES PATENT OFFICE 2,282,323

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application September 18, 1940, Serial No. 357,290

17 Claims. (Cl. 260—157)

This invention relates to new azo dye compounds and their application to the art of coloring.

We have discovered that the azo dye compounds selected from the group consisting of compounds having the general formulae:

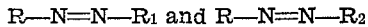

wherein R represents the residue of a member selected from the group consisting of an aryl nucleus of the benzene series and an aryl nucleus of the naphthalene series, $R_1$ represents the residue of a benzodihydroindazole joined to the azo bond through the carbon atom in its 5-position and $R_2$ represents the residue of an $\alpha$-naphthodihydroindazole joined to the azo bond through the carbon atom in its 5-position constitute a valuable class of dye compounds. Depending upon their structure, the azo compounds of our invention possess application for the coloration of organic derivatives of cellulose, silk and wool. Coloration can be effected by dyeing, printing, stenciling or like methods.

While our invention relates broadly to the azo dye compounds defined above, it relates more particularly to those compounds having the general formulae:

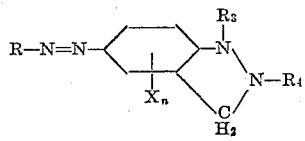

and

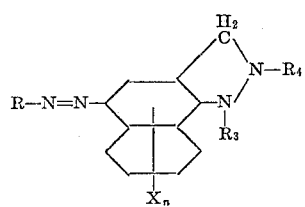

wherein R represents the residue of a member selected from the group consisting of an aryl nucleus of the benzene series and an aryl nucleus of the naphthalene series, $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy and an amino group and $n$ represents zero or a small whole positive number.

Compounds having the general formulae:

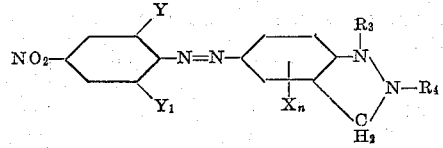

and

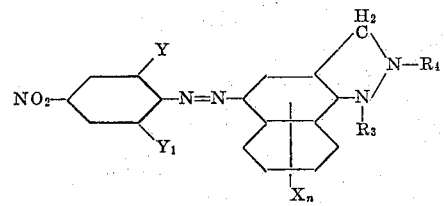

wherein $R_3$, $R_4$, X and $n$ have the meaning previously assigned to them and Y and $Y_1$ each represents a member selected from the group consisting of hydrogen, a halogen atom, a nitro, an alkylsulfone, a sulfonamide, a hydroxy, an alkoxy, an alkyl, a cyano, an alkylketo and a —COOY$_2$ group wherein $Y_2$ represents a member selected from the group consisting of hydrogen, an alkyl group and an alkali-forming metal appear to be particularly advantageous.

Both sulfonated and non-sulfonated compounds are included within the scope of our invention. The nuclear non-sulfonated compounds have been found to be especially of value for the dyeing of organic derivatives of cellulose and it is to these compounds and their application for the dyeing of organic derivatives of cellulose that our invention is especially directed. These nuclear non-sulfonated compounds likewise possess some application for the dyeing of wool and silk. For the dyeing of organic derivatives of cellulose such as cellulose acetate silk, nuclear non-sulfonated dye compounds wherein R is the residue of a benzene nucleus are generally advantageous.

The nuclear sulfonated compounds of our invention have little or no utility for the dyeing of organic derivatives of cellulose but possess application for the dyeing of wool and silk. Preferably, when the dye compounds of our invention are to be employed for the coloration of organic derivatives of cellulose, they should contain no nuclear free carboxylic acid group. Red, orange, greenish-blue, blue, and violet dyeings, for example, can be obtained employing the dye compounds of our invention.

It is an object of our invention to provide a new class of azo dye compounds suitable for the coloration of organic derivatives of cellulose, wool and silk. Another object of our invention is to provide a process for the coloration of organic derivatives of cellulose, wood and silk. A further object is to provide colored textile materials which are of good fastness to light and washing. A particular object of our invention is to provide a new class of nuclear non-sulfonated azo dyes suitable for the coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose. While the process of our invention will be illustrated more particularly in connection with the coloration of cellulose acetate, a material which is especially adapted to be colored by the nuclear non-sulfonated dye compounds of our invention, it will be clearly understood that the dye compounds of our invention can be used to color other organic derivatives of cellulose such as those just mentioned as well as the other materials named.

The azo dye compounds of our invention can be prepared by diazotizing diazotizable members selected from the group consisting of an arylamine of the benzene series and an aminonaphthalene and coupling the diazonium compounds obtained with benzodihydroindazole and α-naphthodihydroindazole compounds having no substituent which would prevent their coupling.

It will be understood that the term "alkyl," as used herein and in the claims, unless otherwise indicated, includes not only unsubstituted alkyl groups such as the methyl group, the ethyl group, a propyl group or a butyl group but also substituted alkyl groups, such as β-hydroxyethyl, β-hydroxypropyl, β,γ-dihydroxypropyl, Δ-hydroxybutyl and the ethers thereof such as β-methoxyethyl, β-ethoxyethyl, Δ-methoxybutyl and γ-methoxypropyl as well as the esters thereof such as the methyl or ethyl esters. Similarly, alkyl groups substituted by halogen or cyano, such as β-chlorethyl, γ-chloropropyl, β-iodoethyl, β-cyanoethyl and γ-cyanopropyl are included. Further, alkyl groups substituted with a sulfonic sulfato or acid ester of phosphorus group such as β-sulfoethyl, γ-sulfopropyl, β-sulfatoethyl, γ-sulfatopropyl, Δ-sulfatobutyl, β-phosphatoethyl, β-phosphatopropyl, and γ-phosphatopropyl are likewise included.

The term "furyl" includes groups such as furfuryl, tetrahydrofurfuryl, 5-ethylfurfuryl, 5-ethyltetrahydrofurfuryl, and 5-β-hydroxyethyltetrahydrofurfuryl. Similarly, the term alkoxy includes unsubstituted alkoxy groups such as methoxy, ethoxy, propoxy and butoxy as well as substituted alkoxy groups such as β-methoxyethoxy and β-ethoxyethoxy. Chlorine, bromine and iodine are illustrative halogen atoms. The term "amino" includes the amino group as well as substituted amino groups such as methylamino, ethylamino, dimethylamino, mono-β-hydroxyethylamino, di-β-hydroxyethylamino, monoglycerylamino and acylamino groups such as acetylamino and propionylamino. Illustrative alkali-forming metals include sodium, potassium, calcium, barium and ammonium. The term "phenyl" likewise includes not only the phenyl group but phenyl groups substituted, for example, with a halogen atom, an alkyl group, a hydroxy group, an alkoxy group, a cyano group and a nitro group.

The following examples illustrate the preparation of the compounds of our invention:

Example 1

1 gram mole of p-aminoacetophenone is diazotized in known fashion and the diazonium compound obtained is coupled in a cold dilute hydrochloric acid solution of 1,2-di-β-hydroxyethylbenzodihydroindazole. The coupling reaction is completed by adding sodium acetate until the reaction mixture is neutral to Congo red paper following which the dye compound is recovered by filtration, washed with water and dried. The dye compound obtained colors cellulose acetate silk orange.

Example 2

1 gram mole of p-nitroaniline is diazotized and coupled in accordance with the procedure indicated in Example 1 with 1 gram mole of 1-methyl-2-glycerylbenzodihydroindazole. The dye compound obtained colors cellulose acetate silk red.

Example 3

1 gram mole of 1-amino-fluoro-4-nitrobenzene is diazotized and the diazonium compound obtained is coupled in accordance with the method indicated in Example 1 with 1 gram mole of 1,2-di-β-hydroxypropyl-6-methylbenzodihydroindazole. The dye compound obtained colors cellulose acetate silk rubine.

Example 4

1 gram mole of 1-amino-2-hydroxy-4-nitrobenzene is diazotized and coupled in accordance with the general method indicated in Example 1 with 1 gram mole of 1-sulfoethyl-2-acetyl-4-methylbenzodihydroindazole. The dye compound is precipitated from the reaction mixture by salting with sodium chloride following which it is recovered by filtration, washed with water and dried. The dye compound obtained colors cellulose acetate silk, wool and silk pinkish-rubine.

Example 5

1 gram mole of p-aminobenzene is diazotized and the diazonium compound obtained is coupled in a cold dilute hydrochloric acid solution with 1 gram mole of 6-hydroxy-1-sulfatoethyl-2-ethyl-α-naphthodihydroindazole. The coupling reaction is completed by adding sodium acetate until the reaction mixture is neutral to Congo red paper following which the dye compound formed is recovered by filtration, washed with water and dried. The dye compound obtained colors cellulose acetate silk, wool and silk blue.

Example 6

1 gram mole of 2,4-dinitroaniline is diazotized and the diazonium compound obtained is coupled in a cold concentrated acetic acid solution of 1 gram mole of 1-glyceryl-2-phenyl-6-methyldihydrobenzoindazole. The coupling reaction is completed by adding sodium carbonate until the reaction mixture is neutral to Congo red paper following which the dye compound is precipitated by the addition of water, recovered by filtration, washed with water and dried. The dye compound obtained colors cellulose acetate silk violet.

Example 7

1 gram mole of 3,5-dinitro-2-aminobenzene-sulfonethylamide is diazotized and coupled with 1 gram mole of 1-butyl-2-pentahydroxyhexyl-4-acetaminobenzodihydroindazole. The dye compound obtained colors cellulose acetate silk greenish-blue.

Example 8

1 gram mole of 1-amino-2-,4-dinitro-6-chlorobenzene is diazotized and coupled in accordance with the method described in Example 6 with 1 gram mole of 1,2-di-β-hydroxyethyl-6-acetaminobenzodihydroindazole. The dye compound obtained colors cellulose acetate silk blue.

Example 9

1 gram mole of 3,5-dinitro-2-aminophenylmethylsulfone is diazotized and coupled with 1 gram mole of 1, 2-diglyceryl-α-naphthodihydroindazole. The dye compound obtained colors cellulose acetate silk blue.

The following tabulation further illustrates the compounds included within the scope of our invention together with the colors they yield on cellulose acetate silk. The compound indicated below can be prepared by diazotizing the amines listed under the heading "Amine" and coupling the diazonium compounds obtained with the compounds specified in the column entitled "Coupling component." The diazotization and coupling reactions may, for example, be carried out following the general procedure described hereinbefore.

The numbering given is that employed throughout the specification and claims.

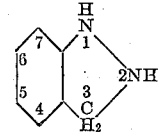

Benzodihydroindazole

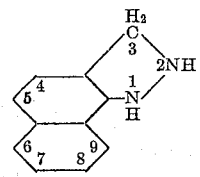

α-naphthodihydroindazole

Attention is directed to the fact that benzoindazole is frequently referred to as indazole.

The benzodihydroindazole and α-naphthodihydroindazole coupling components employed in the preparation of the azo compounds of our invention can be prepared by reducing benzoindazole and α-naphthoindazole and substituted benzoindazole and α-naphthodihydroindazole compounds. The compounds thus obtained can, in turn, be treated to introduce desired substituents therein.

Preparation of benzodihydroindazole and α-naphthodihydroindazole 1 gram mole of benzoindazole is charged into a shaking autoclave with concentrated acetic acid, acetic anhydride and platinum oxide.

| Amine | Coupling component | Color |
| --- | --- | --- |
| 1-amino-2-methoxy-4-nitrobenzene | (1) Benzodihydroindazole | Red. |
| Do | (2) 1-tetrahydrofurfurylbenzodihydroindazole | Do. |
| Do | (3) 1-phenylbenzodihydroindazole | Do. |
| Do | (4) 1 - β - hydroxyethyl - 6 - chlorobenzodihydroindazole. | Orange. |
| Do | (5) 2-tetrahydrofurfurylbenzodihydroindazole | Red. |
| Do | (6) 1-β-hydroxyethyl-6-methoxybenzodihydroindazole. | Do. |
| Do | (7) α-Naphthodihydroindazole | Rubine. |
| Do | (8) 6-hydroxy-α-naphthodihydroindazole | Blue. |
| 1-amino-2-methyl-4-nitrobenzene | Coupling components 1-8 | Orange to blue. |
| 1-amino-2, 4-dinitro-6-cyanobenzene | do | Red to blue-green. |
| 1-amino-2-methylketo-4-nitrobenzene | do | Do. |
| 1-amino-2-carboxy-4-nitrobenzene | do | Red to blue. |
| 1-amino-2-carboxyethyl-4-nitrobenzene | do | Do. |
| α-Naphthylamine | do | Orange-purple. |
| 1-amino-4-nitro-naphthalene | do | Orange-blue. |

Sulfonated amines which can be diazotized and the diazonium compounds obtained coupled with any of the components shown herein to obtain dye compounds of our invention include, for example, p-sulfanilic acid, 1-amino-4-sulfonic naphthalene, 2-naphthylamine-8-sulfonic acid, 1-naphthylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, 1-amino - 5 - naphthol - 7 - sulfonic acid, metanilic acid, 1-amino-2-sulfonic-4-nitrobenzene, 1-amino-2,4-disulfonic benzene and 1-amino-2-chloro-4-sulfonic benzene.

To illustrate, diazotized p-sulfanilic acid can be coupled with benzodihydroindazole to give a dye compound which colors wool and silk orange. Similarly, diazotized 1-naphthylamine-6-sulfonic acid can be coupled with 1-β-hydroxyethylbenzodihydroindazole to give a dye compound which colors wool and silk bluish-red.

For purposes of clarity it is here noted that benzodihydroindazole and α-naphthodihydroindazole are numbered as indicated hereinafter.

Shaking is started and hydrogen under a pressure of 50 pounds per square inch is added. When 1 gram mole of hydrogen has been taken up, the autoclave is opened and the 1,2-diacetylbenzodihydroindazole removed. The product obtained is hydrolyzed by warming with 2 moles of 5% hydrochloric acid. Benzodihydroindazole is precipitated from the reaction mixture by adding sodium carbonate and recovered by filtration. α-naphthodihydroindazole can be prepared in a similar manner from naphthoindazole.

Preparation of 2-β-methoxyethyldihydroindazole 1 gram mole of benzodihydroindazole, 1.1 gram mole of β-methoxyethylbromide and 1.1 gram mole of sodium carbonate are heated together over a steam bath with stirring for four hours. Ethyl alcohol is then added following which the reaction mixture is filtered to remove salt and the desired product is recovered from the filtrate by distillation. Some 1-β-methoxyethyldihydroindazole is formed in the reaction and may be separated from the corresponding 2-compound by fractional crystallization.

*Preparation of 1-β-hydroxyethylbenzodihydroindazole*

This compound can be prepared by reacting benzodihydroindazole with β-hydroxyethylbromide in accordance with the procedure just described. Any 2-β-hydroxyethylbenzodihydroindazole formed can be separated from the corresponding 1-compound by fractional crystallization.

The preparation of various other benzodihydroindazole compounds is indicated hereinafter. 2(n)-phenyldihydroindazole can be prepared from 2(n)-phenylindazole as described in Berichte vol. 24, pages 959, 963 and 964 and Berichte vol. 59, pages 530 and 531. 2(n)-p-chlorophenylindazole, 2(n)-p-bromophenylindazole, 2(n)-p-ethoxyphenylindazole and 2(n)p-oxyphenylindazole can be prepared as described in Berichte vol. 24, pages 964–966 inclusive. These compounds can be reduced by the method described in the Berichte references just mentioned to the corresponding dihydroindazole compounds. Other benzodihydroindazole compounds that can be converted to the benzodihydroindazole compounds of our invention include, for example, 5-methyl-7-amino-benzoindazole, Berichte, vol 59, pages 539, 544 and 545, 1-acetyl-5-methyl-7-diacetylamino-benzoindazole, Berichte, vol. 59, page 545, 2-acetyl-5-methyl-7-acetylamino-benzoindazole, Berichte, vol. 59, page 545, 5-methyl-7-acetylamino-benzoindazole, Berichte, vol. 59, pages 546 and 547, and 5-methyl-7-benzoylamino-benzoindazole, Berichte, vol. 59, page 548.

Substituents represented by the letter X are not ordinarily directly introduced into the ring of the dihydroindazole compound. These substituents are obtained in the ring by preparing the dihydroindazole compounds from the substituted indazole compounds. The preparation of a considerable number of substituted indazole compounds has been indicated above.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water-soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds selected from the group consisting of compounds having the general formulae:

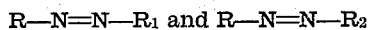

wherein R represents the residue of a member selected from the group consisting of an aryl nucleus of the benzene series and an aryl nucleus of the naphthalene series, $R_1$ represents the residue of a benzodihydroindazole coupling component joined to the azo bond through the carbon atom in its 5-position and $R_2$ represents the residue of an α-naphthodihydroindazole coupling component joined to the azo bond through the carbon atom in its 5-position.

2. The azo dye compounds having the general formula:

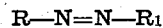

wherein R represents the residue of a member selected from the group consisting of an aryl nucleus of the benzene series and an aryl nucleus of the naphthalene series and $R_1$ represents the residue of a benzodihydroindazole coupling component joined to the azo bond through the carbon in its 5-position.

3. The azo dye compounds having the general formula:

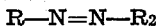

wherein R represents the residue of a member selected from the group consisting of an aryl nucleus of the benzene series and an aryl nucleus of the naphthalene series and $R_2$ represents the residue of an α-naphthodihydroindazole coupling component joined to the azo bond through the carbon atom in its 5-position.

4. The azo dye compounds selected from the group consisting of compounds having the general formulae:

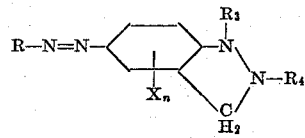

and

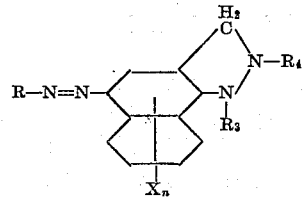

wherein R represents the residue of a member selected from the group consisting of an aryl nucleus of the benzene series and an aryl nucleus of the naphthalene series, $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy and an amino group and $n$ represents zero or a small whole positive number.

5. The azo dye compounds having the general formula:

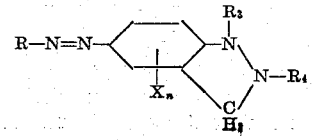

wherein R represents the residue of an aryl nucleus of the benzene series, $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy and an amino group and $n$ represents zero or a small whole positive number.

6. The azo dye compounds having the general formula:

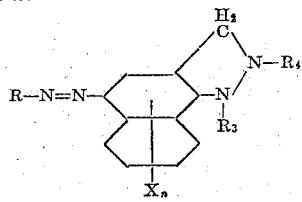

wherein R represents the residue of an aryl nucleus of the benzene series, $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy and an amino group and $n$ represents zero or a small whole positive number.

7. The azo dye compounds having the general formula:

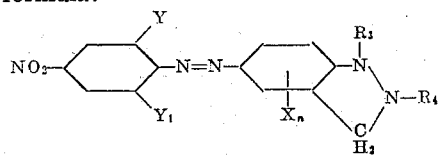

wherein $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy, and an amino group, $n$ represents zero or a small whole positive number and Y and $Y_1$ each represents a member selected from the group consisting of hydrogen, a halogen atom, a nitro, an alkylsulfone, a sulfonamide, a hydroxy, an alkoxy, an alkyl, a cyano, an alkylketo and a —$COOY_2$ group wherein $Y_2$ represents a member selected from the group consisting of hydrogen, an alkyl group and an alkali-forming metal.

8. The azo dye compounds having the general formula:

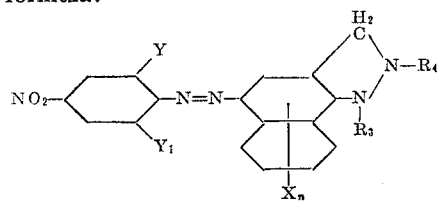

wherein $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy, and an amino group, $n$ represents zero or a small whole positive number and Y and $Y_1$ each represents a member selected from the group consisting of hydrogen, a halogen atom, a nitro, an alkylsulfone, a sulfonamide, a hydroxy, an alkoxy, an alkyl, a cyano, an alkylketo and a —$COOY_2$ group wherein $Y_2$ represents a member selected from the group consisting of hydrogen, an alkyl group and an alkali-forming metal.

9. The azo dye compounds having the general formula:

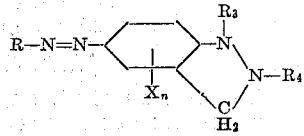

wherein R represents the residue of an aryl nucleus of the benzene series, $R_3$ and $R_4$ each represents an alkyl group, X represents a member selected from the group consisting of a halogen atom, a hydroxy, an alkoxy, an alkyl, and an amino group and $n$ represents zero or a small whole positive number.

10. The azo dye compounds having the general formula:

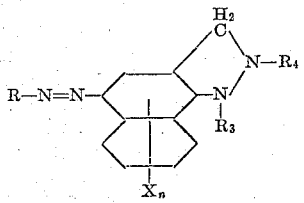

wherein R represents the residue of an aryl nucleus of the benzene series, $R_3$ and $R_4$ each represents an alkyl group, X represents a member selected from the group consisting of a halogen atom, a hydroxy, an alkoxy, an alkyl, and an amino group and $n$ represents zero or a small whole positive number.

11. The azo dye compound having the formula:

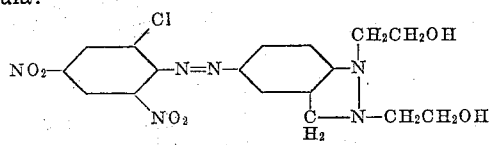

12. Textile material colored with an azo dye compound selected from the group consisting of compounds having the general formulae:

$$R-N=N-R_1 \text{ and } R-N=N-R_2$$

wherein R represents the residue of a member selected from the group consisting of an aryl nucleus of the benzene series and an aryl nucleus of the naphthalene series, $R_1$ represents the residue of a benzodihydroindazole coupling component joined to the azo bond through the carbon atom in its 5-position and $R_2$ represents the residue of an α-naphthodihydroindazole coupling component joined to the azo bond through the carbon atom in its 5-position.

13. Textile material colored with an azo dye compound selected from the group consisting of compounds having the general formulae:

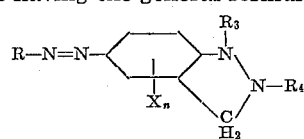

and

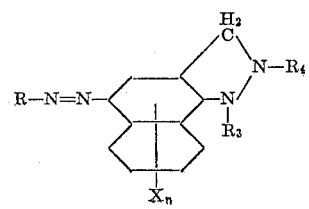

wherein R represents the residue of a member selected from the group consisting of an aryl nucleus of the benzene series and an aryl nucleus of the naphthalene series, $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy and an amino group and $n$ represents zero or a small whole positive number.

14. Textile material colored with an azo dye compound having the general formula:

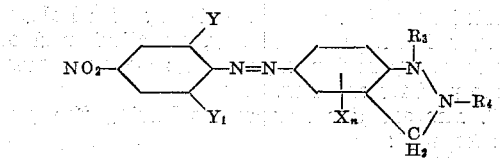

wherein $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy, and an amino group, $n$ represents zero or a small whole positive number and Y and $Y_1$ each represents a member selected from the group consisting of hydrogen, a halogen atom, a nitro, an alkylsulfone, a sulfonamide, a hydroxy, an alkoxy, an alkyl, a cyano, an alkylketo and a —$COOY_2$ group wherein $Y_2$ represents a member selected from the group consisting of hydrogen, an alkyl group and an alkali forming metal.

15. Cellulose acetate colored with an azo dye compound selected from the group consisting of nuclear non-sulfonated azo compounds having the general formulae:

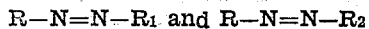

R—N=N—$R_1$ and R—N=N—$R_2$ wherein R represents the residue of a member selected from the group consisting of an aryl nucleus of the benzene series and an aryl nucleus of the naphthalene series, $R_1$ represents the residue of a benzodihydroindazole coupling component joined to the azo bond through the carbon atom in its 5-position and $R_2$ represents the residue of an α-naphthodihydroindazole coupling component joined to the azo bond through the carbon atom in its 5-position.

16. Cellulose acetate colored with a nuclear non-sulfonated azo dye compound having the general formula:

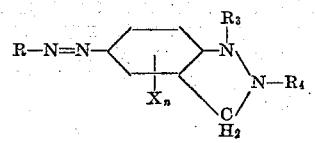

wherein R represents the residue of an aryl nucleus of the benzene series, $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy and an amino group and $n$ represents zero or a small whole positive number.

17. A cellulose acetate colored with a nuclear non-sulfonated azo dye compound having the general formula:

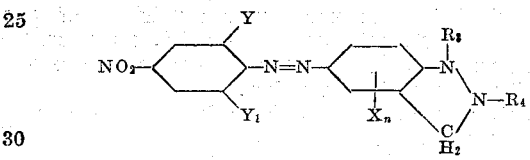

wherein $R_3$ and $R_4$ each represents a member selected from the group consisting of hydrogen, an alkyl group, a benzene nucleus and a furyl group, X represents a member selected from the group consisting of a halogen atom, a hydroxy, an alkyl, an alkoxy, and an amino group, $n$ represents zero or a small whole positive number and Y and $Y_1$ each represents a member selected from the group consisting of hydrogen, a halogen atom, a nitro, an alkylsulfone, a sulfonamide, a hydroxy, an alkoxy, an alkyl, a cyano, an alkylketo and a —$COOY_2$ group wherein $Y_2$ represents a member selected from the group consisting of hydrogen, an alkyl group and an alkali-forming metal.

JOSEPH B. DICKEY.
JAMES G. McNALLY.

CERTIFICATE OF CORRECTION.

Patent No. 2,282,323.   May 12, 1942.

JOSEPH B. DICKEY, ET AL.

It is hereby certified that error appears in the printed specification of the above numbered patent requiring correction as follows: Page 2, second column, line 50, for "p-aminobenzene" read --p-aminoazobenzene--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.